United States Patent
Inagaki et al.

(10) Patent No.: US 8,691,440 B2
(45) Date of Patent: Apr. 8, 2014

(54) ACTIVE MATERIAL FOR BATTERY, NONAQUEOUS ELECTROLYTE BATTERY, BATTERY PACK, AND VEHICLE

(75) Inventors: Hiroki Inagaki, Kawasaki (JP); Keigo Hoshina, Yokohama (JP); Yasuhiro Harada, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 13/053,865

(22) Filed: Mar. 22, 2011

(65) Prior Publication Data
US 2012/0028108 A1 Feb. 2, 2012

(30) Foreign Application Priority Data
Jul. 29, 2010 (JP) .................. 2010-171133

(51) Int. Cl.
H01M 4/13 (2010.01)
H01M 2/02 (2006.01)
H01M 4/02 (2006.01)

(52) U.S. Cl.
USPC .................. 429/231.5; 429/209; 429/156

(58) Field of Classification Search
None
See application file for complete search history.

(56) References Cited

U.S. PATENT DOCUMENTS

| 2008/0076030 A1* | 3/2008 | Inagaki et al. ............. 429/330 |
| 2009/0042095 A1 | 2/2009 | Inagaki et al. |
| 2010/0248038 A1* | 9/2010 | Takami et al. ............. 429/332 |
| 2011/0045328 A1 | 2/2011 | Inagaki et al. |
| 2011/0052942 A1 | 3/2011 | Inagaki et al. |
| 2011/0052993 A1 | 3/2011 | Hoshina et al. |
| 2011/0052994 A1 | 3/2011 | Harada et al. |

FOREIGN PATENT DOCUMENTS

| CN | 101630735 | * 1/2010 | ............. H01M 4/04 |
| JP | 2005-302601 | * 10/2005 | ............. H01M 4/58 |
| JP | 2008-34368 | 2/2008 | |
| JP | 2008-117625 | 5/2008 | |
| JP | 2010-123401 | 6/2010 | |
| WO | WO 2005/018027 A1 | 2/2005 | |
| WO | WO 2009/028553 A1 | 3/2009 | |

OTHER PUBLICATIONS

U.S. Appl. No. 13/197,303, filed Aug. 3, 2011, Harada, et al.
Japanese Office Action issued Oct. 23, 2012, in Patent Application No. 2010-171133 (with English-language translation).
René Marchand, et al., "TiO$_2$(B) a New Form of Titanium Dioxide and the Potassium Octatitanate K$_2$Ti$_8$O$_{17}$", Mat. Res. Bull., vol. 15, 1980, pp. 1129-1133.
U.S. Appl. No. 13/053,913, filed Mar. 22, 2011, Inagaki, et al.
Office Action and Search Report issued Aug. 6, 2013 in Chinese Patent Application No. 201110217203.2 (with English-language translation).

* cited by examiner

Primary Examiner — Barbara Gilliam
Assistant Examiner — Angela Martin
(74) Attorney, Agent, or Firm — Oblon, Spivak, McClelland, Maier & Neustadt, L.L.P.

(57) ABSTRACT

According to one embodiment, there is provided an active material for a battery. The active material comprises a monoclinic β-type titanium composite oxide which contains fluorine.

13 Claims, 10 Drawing Sheets

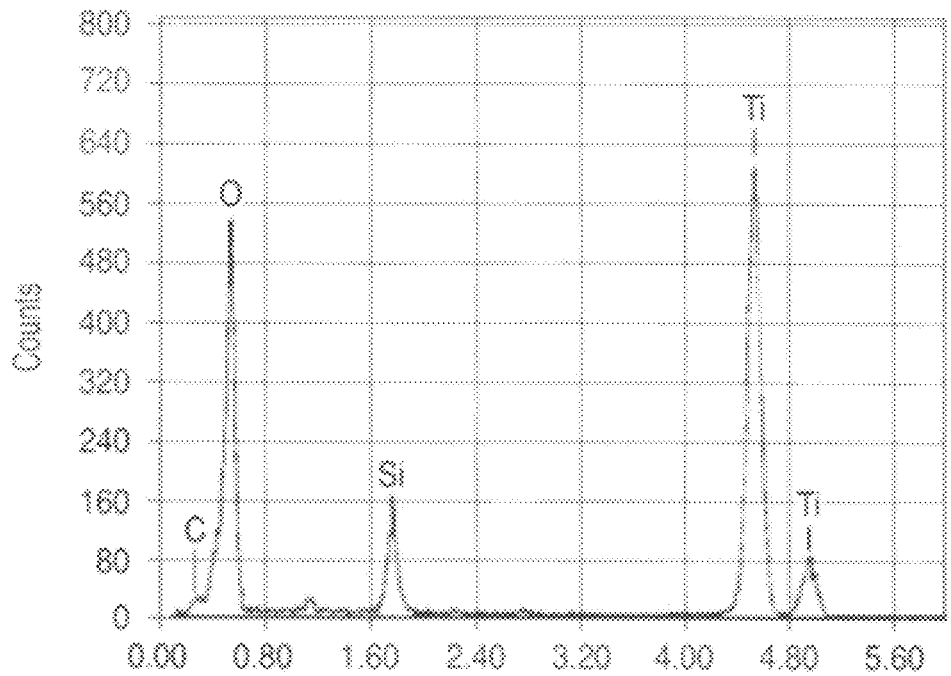
F I G. 12
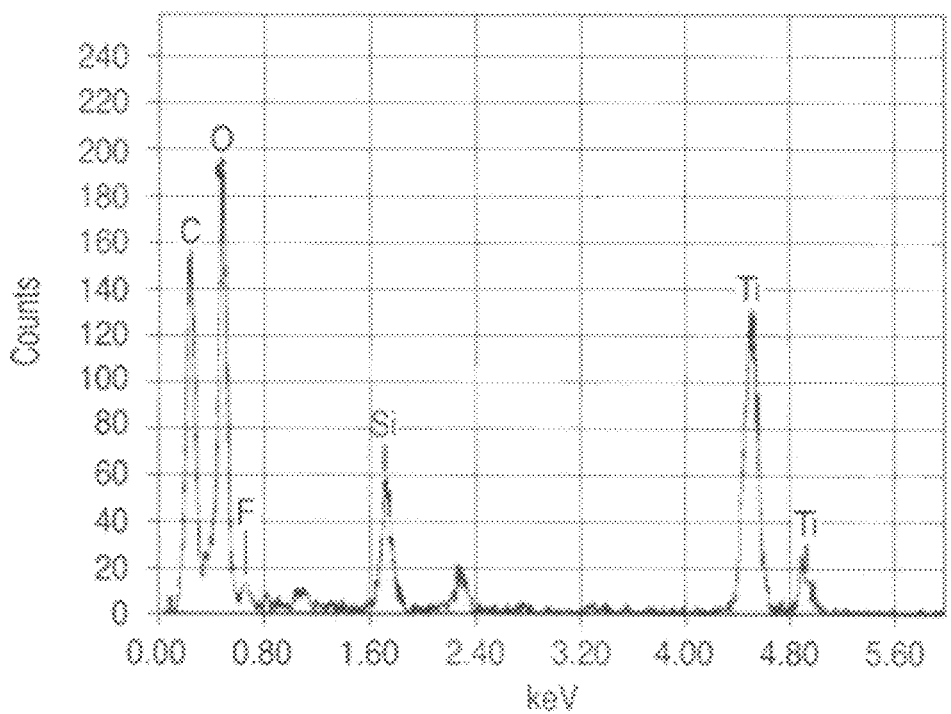
F I G. 13

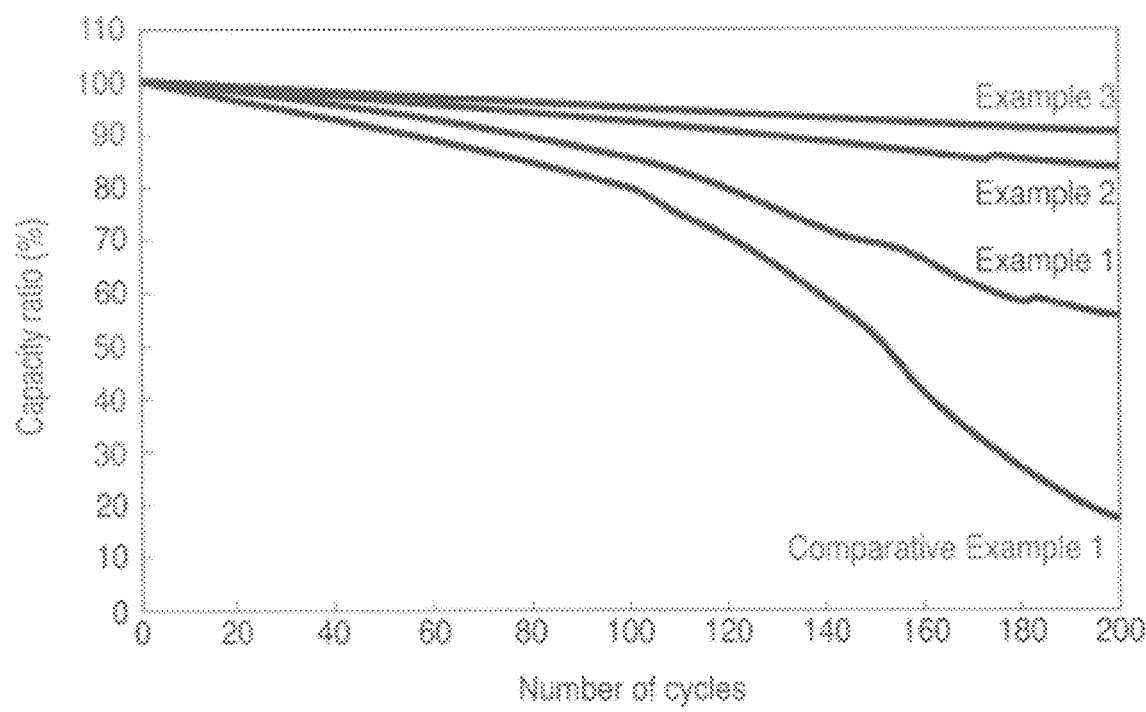
F I G. 14

ACTIVE MATERIAL FOR BATTERY, NONAQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Application No. 2010-171133, filed Jul. 29, 2010; the entire contents of which are incorporated herein by reference.

FIELD

Embodiments described herein relate generally to an active material for a battery, a nonaqueous electrolyte battery, a battery pack and a vehicle.

BACKGROUND

In recent years, attention has been paid to a titanium oxide having a monoclinic β-type structure as an active material for a nonaqueous electrolyte battery. About a lithium titanate having a spinel structure ($Li_4Ti_5O_{12}$), which has been hitherto put into practical use, the number of lithium ions that can be intercalated and eliminated per unit chemical formula thereof is three. For this reason, the number of lithium ions that can be intercalated and eliminated per titanium ion is 3/5. Thus, the number is theoretically 0.6 at most. In the meantime, about a titanium oxide having a monoclinic β-type structure, the number of lithium ions that can be intercalated and eliminated per titanium ion is 1.0 at most. Therefore, the titanium oxide has a high theoretical capacity of about 335 mAh/g. Thus, it has been expected to develop a battery with an excellent performance using a titanium oxide having a monoclinic β-type structure.

BRIEF DESCRIPTION OF THE DRAWINGS

FIG. 12 is a graph showing analysis results of a point 1 in FIG. 11;

FIG. 13 is a graph showing analysis results of a point 2 in FIG. 11; and

FIG. 14 is a graph showing a change in the capacity of Examples 1 to 3 and Comparative Example 1.

DETAILED DESCRIPTION

In general, according to one embodiment, there is provided an active material for a battery. The active material comprises a monoclinic β-type titanium composite oxide which contains fluorine.

According to another embodiment, there is provided a nonaqueous electrolyte battery comprising a positive electrode, a negative electrode comprising the active material for a battery according to the above embodiment, and a nonaqueous electrolyte.

According to another embodiment, there is provided a battery pack comprising at least one nonaqueous electrolyte battery according to the above embodiment.

According to another embodiment, there is provided a vehicle comprising the battery pack according to the above embodiment.

Hereinafter, the embodiments will be described with reference to the attached drawings.

(First Embodiment)

Figure 1:
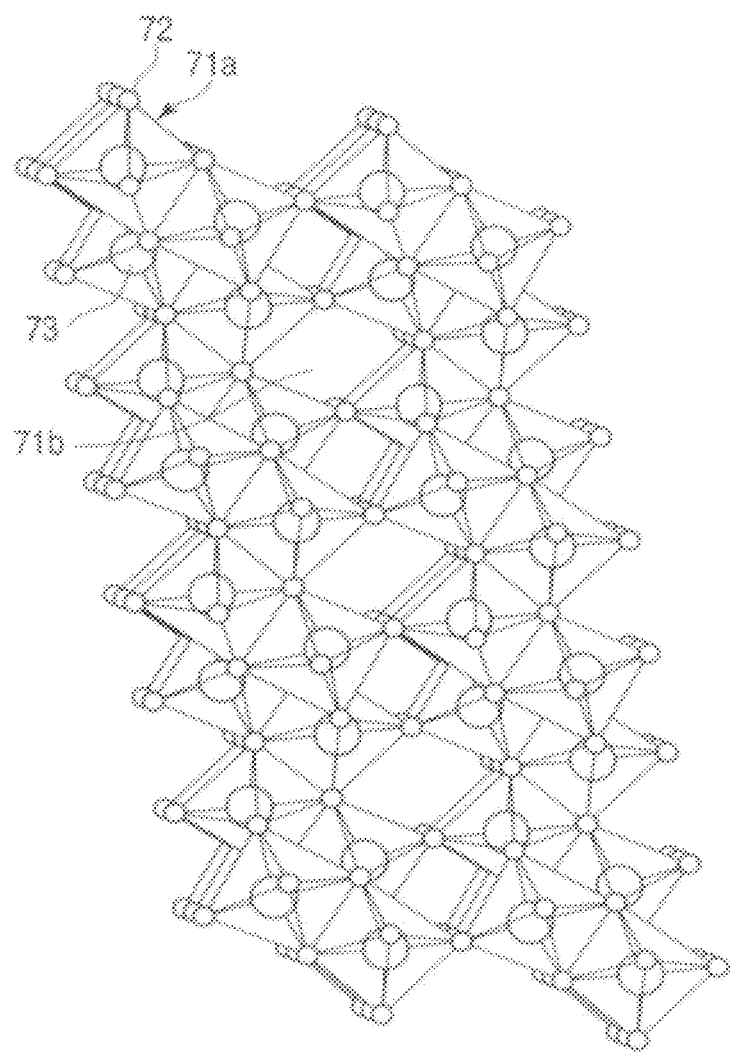
FIG. 1 is a schematic view showing the crystal structure of a monoclinic β-type titanium oxide ($TiO_2(B)$)

The crystal structure of the monoclinic titanium dioxide belongs primarily to the space group C2/m, showing a tunnel structure as shown in FIG. 1. Here, the crystal structure of monoclinic titanium dioxide is referred to as monoclinic β-type structure. Also, the titanium composite oxide having a monoclinic β-type structure is referred to as a monoclinic β-type titanium composite oxide. Incidentally, the detailed crystal structure of monoclinic titanium dioxide is described in R. Marchand, L. Brohan, M. Tournoux, Material Research Bulletin 15, 1129 (1980).

As shown in FIG. 1, in monoclinic β-type structure, a titanium ion 73 and oxide ions 72 constitute of skeleton structural moieties 71a. The skeleton structural moieties 71a are alternately arranged. Between the skeleton structural moieties 71a, voids 71b are formed. The voids 71b can each become a host site in which a different atom species is intercalated (i.e. inserted). It is said about monoclinic β-type structure that host sites which are each capable of adsorbing and releasing a different atom species are also present in a surface of the crystal thereof. Lithium ions are intercalated into these host sites and eliminated therefrom. Therefore, titanium oxide having monoclinic β-type structure can reversely adsorb and release the lithium ions.

When lithium ions are intercalated into the voids 71b, $Ti^{4+}$ ions which constitute the skeleton are reduced to $Ti^{3+}$ ions. In this way, the electrical neutralization of the crystal is kept. The titanium oxide which has monoclinic β-type structure has a single $Ti^{4+}$ ion per unit chemical formula thereof. Thus, at most, a single lithium ion can be intercalated between any two of the layers. For this reason, the titanium oxide which has monoclinic β-type structure can be represented by the following formula: $Li_xTiO_2$ wherein $0 \le x \le 1$. In this case, a theoretical capacity of 335 mAh/g is obtained.

It has been come to understand that in the process of synthesizing a monoclinic β-type titanium composite oxide, hydroxyl groups tend to be remained. The hydroxyl groups present in the titanium oxide cause decomposition of an electrolytic solution, so as to generate decomposition products such as lithium fluoride and lithium oxide. These decomposition products cause the formation of a high-resistance coating in the surface of an active material. Moreover, the hydroxyl groups react immediately with a lithium salt in the nonaqueous electrolytic solution to generate a free acid. These matters cause a fall in performances of the battery, such as the lifetime performance and the high-current performance.

In the process of synthesizing a monoclinic β-type titanium composite oxide, an intermediate product is baked at the low temperature. So that hydroxyl groups seem to be remained in the monoclinic β-type titanium composite oxide. In the ordinary synthesis process, a proton exchange body as the intermediate product is baked at a temperature of about 400° C., thereby undergoing dehydrating reaction. In order to remove the hydroxyl groups completely, it is necessary for the proton exchange body to be heated at a high temperature of about 800° C. In this case, however, there is caused a problem that the crystal structure is changed.

Thus, according to the present embodiment, there is provided an active material for a battery which comprises a monoclinic β-type titanium composite oxide which contains fluorine. The bond energy of Ti—OH is 478 kJ/mol, and that of Ti—F is 581 kJ/mol. Thus, it is possible to substitute the hydroxyl groups with fluorine atoms which have a lower bond energy by adding fluorine to a monoclinic β-type titanium oxide which have residual hydroxyl groups. The reactivity of an active material comprising the oxide with an electrolytic solution is restricted by substituting at least one part of the hydroxyl groups of the oxide with fluorine atoms. This matter contributes to a great improvement in the high-current property and the charge/discharge cycle performance of the battery.

It is preferred that the monoclinic β-type titanium composite oxide contained in the active material has a shape of particle. The particle preferably has fluorine in a surface layer. The surface layer of the particle is constituted of the surface of the particle and outer layer having a depth of less than 20 nm from the surface of the particle.

Fluorine may be contained in a central part of the particle. In the embodiment, the central part means the region where the depth is 20 nm or more from the surface of the particle. It is however preferred for an efficient substitution of the hydroxyl groups in the monoclinic β-type titanium composite oxide that the fluorine content in the surface layer is higher than that in the central part.

It is preferred that the active material for a battery of the embodiment is in the form of secondary particles containing the monoclinic β-type titanium composite oxide as primary particles.

It is also preferred that the monoclinic β-type titanium composite oxide has a fluorine content of 0.12% to 10% by mass. When the oxide contains fluorine in an amount of 0.12% or more by mass, a sufficient effect of removing the hydroxyl groups can be obtained so that an excessive formation of a high-resistance coating can be restrained. When the content is 10% or less by mass, the generation of a different phase in the crystal structure of the monoclinic β-type titanium composite oxide can be prevented. So that the decrease in the electrical capacity and the charge/discharge cycle performance of the battery can be limited.

The fluorine content is more preferably 1% to 5% by mass.

The amount of fluorine contained in the monoclinic β-type titanium composite oxide can be determined by ion chromatography. For example, titanium composite oxide taken from a battery is weighed and put into a vessel, and put into a magnetic boat. The oxide is thermally decomposed in a flow of oxygen and water vapor, and a gas generated therefrom is trapped into an aqueous solution so as to prepare a measuring solution.

The measuring solution is used to measure the fluorine content. The fluorine content can be measured with a device: DX-120 (manufactured by Nippon Dionex K.K.).

Alternatively, the fluorine content can be measured in arbitrary point of the monoclinic β-type titanium composite oxide with TEM-EDX.

The state of fluorine in the oxide can be determined with an electron beam micro analyzer (EPMA) which is applied to the cross section of the active material, for example, by line analysis or fluorine-mapping. The fluorine content in a region to be measured can be measured by point analysis.

Alternatively, the existence of fluorine can be determined by Fourier transform infrared spectrophotometry (FT-IR) since the monoclinic β-type titanium composite oxide in the embodiment has a Ti—F bond. A peak of the Ti—F bond appeared near 838 $cm^{-1}$. It is therefore preferred that the monoclinic β-type titanium composite oxide in the embodiment has a peak belonging to the Ti—F bond in the range of 800 to 850 $cm^{-1}$ in an infrared diffuse reflection spectrum with FT-IR.

The titanium composite oxide can be taken out from a battery by a method described hereinafter. The battery is dismantled in the state of discharge, and then one of its electrodes (for example, negative electrode) is taken out. The negative electrode layer thereof is inactivated in water. Thereafter, the titanium composite oxide in the negative electrode layer is extracted from the layer. A treatment for the extraction may be conducted by removing conductive agent and binder in the negative electrode layer by, for example, heating treatment in the atmosphere at 200 to 300° C. for less than 3 hours.

When the active material of the embodiment is used as a negative electrode active material, the material may be used alone or together with a different active material. The different active material may be, for example, a lithium titanium composite oxide having a spinel structure (such as $Li_4Ti_5O_{12}$), a titanium composite oxide having an anatase structure or a rutile structure (such as a-$TiO_2$ or r-$TiO_2$), or an iron composite sulfide (such as FeS, or $FeS_2$).

When the active material of the embodiment is used as a positive electrode active material, the material may be used alone or together with a different active material. The different active material may be, for example, a lithium titanium composite oxide having a spinel structure (such as $Li_4Ti_5O_{12}$), a titanium composite oxide having an anatase structure or a rutile structure (such as a-$TiO_2$ or r-$TiO_2$), or an iron composite sulfide (such as FeS, or $FeS_2$).

When an electrode contains other active material, the fluorine content (concentration) may be measured as follows; The negative electrode active material taken out from the electrode is subjected to TEM-EDX, and the crystal structure of each particle is specified by a selected-area diffraction method. Therefrom, a particle having a diffraction pattern belonging to a monoclinic β-type structure is selected, and then the selected particle is subjected to EDX analysis, so as to measure the fluorine content. By setting a point to be measured into a central part or into a surface layer, the value of the fluorine content in each of the regions can be acquired.

In the measurement with Fourier transform infrared spectrophotometry (FT-IR), the titanium composite oxide extracted in the same manner is fixed onto a measuring tool, and then measured. For example, the measurement can be made under the following conditions, using the following apparatus:

Fourier transform type FTIR apparatus: FTS-60A (trade name), manufactured by BioRad Digilab Co.

Light source: Special ceramic material

Detector: DTGS

Wavenumber resolving power: 4 $cm^{-1}$

The number of multiplication times (integration times): 128 or more

Attached device: diffuse reflection measuring device (manufactured by PIKE Technologies Co.)

The particle of the monoclinic β-type titanium composite oxide, that is, the primary particle preferably has an average particle diameter of 10 nm to 1 μm. When the average particle diameter of the primary particle is 10 nm or more, the oxide is easily handled in an industrial production. When the average particle diameter is 1 μm or less, lithium ions can be smoothly diffused in the solid of the monoclinic β-type titanium composite oxide.

The secondary particle of the active material preferably has an average particle diameter of 1 μm to 100 μm. When the average particle diameter is 1 μm or more, the active material is easily handled in an industrial production. When the average particle diameter is 100 μm or less, the mass and the thickness of the electrode layer are not easily made uniform in the process of an electrode, and further the surface smoothness of the layer is easily lowered.

The secondary particle preferably has a specific surface area of 5 $m^2/g$ to 50 $m^2/g$, the area being measured by the BET method. When the specific surface area is 5 $m^2/g$ or more, adsorbing and eliminating sites for lithium ions can be sufficiently secured. When the specific surface area is 50 $m^2/g$ or less, the particles are easily handled in an industrial production thereof.

(Production Method)

Next, a method of producing a monoclinic β-type titanium composite oxide which contains fluorine will be explained.

The method comprises obtaining a proton exchange precursor; reacting the proton exchange precursor with an acid to exchange the alkali cation for proton, thereby obtaining a proton exchange body; heating the proton exchange body to obtain a monoclinic β-type titanium composite oxide.

The proton exchange precursor may be synthesized by conventional method. For example, the precursor may be synthesized by subjecting a starting material to heat treatment in accordance with an ordinary solid phase reaction process. The proton exchange precursor may have any crystal shape. In the case of using potassium titanate ($K_2Ti_4O_9$) as the proton exchange precursor, for example, a flux process may be used to synthesize the precursor.

A monoclinic β-type titanium composite oxide which contains fluorine can be obtained by using a fluorine-containing compound as a starting material when the proton exchange precursor is synthesized. Alternatively, the monoclinic β-type titanium composite oxide which contains fluorine can be obtained by treating a monoclinic β-type titanium composite oxide with fluorine. The monoclinic β-type titanium composite oxide synthesized using the fluorine-containing compound may be further subjected to treatment with fluorine.

In the fluorine-containing monoclinic β-type titanium composite oxide produced by the method of the embodiment, at least one part of residual hydroxyl groups has been substituted with fluorine from a time before the oxide contacts an electrolytic solution. Thus, the formation of a high-resistance coating can be restrained.

Hereinafter, a method of adding fluorine to a monoclinic β-type titanium composite oxide in the synthesis process will be described.

First, the starting materials including a fluorine-containing compound are mixed with at a predetermined ratio, and the mixture is subjected to heat treatment to obtain an alkali titanate compound containing fluorine in a predetermined amount. The fluorine-containing alkali titanate compound is used as a proton exchange precursor. The heat treatment is preferably conducted at a temperature in the range of 800 to 1200° C. for 1 to 100 hours.

Examples of the starting materials include a titanium-containing compound such as $TiO_2$ having anatase structure, and an alkali-cation-containing compound such as $K_2CO_3$, $Na_2CO_3$ and $Cs_2CO_3$.

Examples of the fluorine-containing compound include potassium fluoride, cesium fluoride, and sodium fluoride.

The fluorine-containing alkali titanate compound is, without limitation, preferably a fluorine-containing sodium titanate such as $Na_2Ti_3(O,F)_7$, potassium titanate such as $K_2Ti_4(O,F)_9$, or cesium titanate such as $Cs_2Ti_5(O,F)_{12}$. In accordance with a desired alkali titanate compound, the ratio between the starting materials is decided. The addition amount of the fluorine-containing compound is adjusted in such a manner that the fluorine content in the monoclinic β-type titanium composite oxide to be obtained will be a target value. In a baking step which will be described later, fluorine may vaporize so that the fluorine content may turn smaller than the charged fluorine content. Thus, when the fluorine source is charged, it is preferred to make the fluorine content larger than the target value by several percentages.

Next, proton exchange is conducted. The resultant proton exchange precursor is sufficiently washed with distilled water to remove impurities. Thereafter, the precursor is treated with an acid to exchange alkali cations for protons. The acid treatment may be conducted, for example, by adding the proton exchange precursor into hydrochloric acid having a concentration of 1 M, and then stirring the solution. It is desired to conduct the acid treatment until a sufficient proton exchange is finished. In the proton exchange, the pH of the solution may be adjusted by adding an alkaline solution to the solution. After the finish of the proton exchange, the resultant is again washed with distilled water. About sodium titanate, potassium titanate and cesium titanate, their alkali cations can be exchanged for protons without decomposing their crystal structure. The sodium titanate, potassium titanate and cesium titanate which contain fluorine can be exchanged their alkali cation for proton without decomposing their crystal structure as well.

Before the proton exchange is conducted, it is preferred to mill the proton exchange precursor with a ball mill. The milling of the proton exchange precursor makes it possible to conduct the proton exchange smoothly. The milling may be carried out using zirconia balls about 10 to 15 mm in diameter per 100 $cm^2$ of a container which is rotated at 600 to 1000 rpm for about 1 to 3 hours. The proton exchange precursor can be sufficiently milled by carrying out milling for 1 hour or more. If the milling time is designed to be for 3 hours or less, such a phenomenon that compounds different from an object product are generated by a mechanochemical reaction can be prevented.

After the proton exchange is finished, the product is washed with water and dried to obtain a proton exchange body, which is an intermediate product. The proton exchange body is subjected to heat treatment to obtain a fluorine-containing monoclinic β-type titanium composite oxide, which is a final product.

The heat treatment of the proton exchange body is preferably conducted at 250 to 500° C. By heating at temperature of 250° C. or higher, the crystallinity is improved to make it possible that the electrode capacity, the charge/discharge efficiency and the repetitive property of the battery will be improved. By heating at temperature of 500° C. or lower, the generation of an impurity phase such as an anatase phase can be restrained so that a fall in the capacity can be prevented. The heating temperature is more preferably from 300 to 400° C.

The average particle diameter of the primary particle and that of the secondary particle can be adjusted by the temperature and the period for the heat treatment.

In the monoclinic β-type titanium composite oxide produced by the method, the fluorine content in the surface layer of the particles is higher than that in the central part of the particles. This would be because fluorine contained in the particles vaporizes in the heat treatment step so that the fluorine is shifted to the surface layer of the particles so as to be substituted with the hydroxyl groups.

Next, a method of subjecting a monoclinic β-type titanium composite oxide to treatment with fluorine, thereby obtaining a fluorine-containing monoclinic β-type titanium composite oxide will be described.

The monoclinic β-type titanium composite oxide can be synthesized in the same manner as described above except that no fluorine-containing compound is used as the starting material.

The fluorine treatment can be conducted by bringing the monoclinic β-type titanium composite oxide into direct contact with a fluorine-containing solution. According to such a fluorine treatment, at least one part of residual hydroxyl groups of the monoclinic β-type titanium composite oxide is substituted with fluorine. The fluorine-containing solution may be, for example, hydrofluoric acid.

Alternatively, the fluorine treatment may be conducted by bringing the monoclinic β-type titanium composite oxide into direct contact with a gas containing fluorine. The gas may be, for example, fluorine gas, nitrogen trifluoride gas or chlorine trifluoride gas, or a mixed gas of such a gas and an inert gas. For example, the monoclinic β-type titanium composite oxide is allowed to stand still in a mixed gas of fluorine gas and an inert gas for a given time. As a result, at least one part of residual hydroxyl groups in the titanium composite oxide is substituted with fluorine atoms. By changing the partial pressure of the fluorine gas in this case, the degree of the fluorination of the titanium composite oxide can be adjusted. If the partial pressure of the fluorine gas is too low, it is feared that the gas does not sufficiently permeate into fine pores in the titanium composite oxide. Thus, the partial pressure of the fluorine gas is larger than 3%.

According to the embodiment, an active material for a battery contributing to an excellent charge/discharge cycle performance can be provided.

The active material for a battery according to the embodiment may be used for a positive electrode as well as for a negative electrode. Whether the material is used for a positive electrode or for a negative electrode, an excellent charge/discharge cycle performance can be obtained.

When the active material according to the embodiment is used for a positive electrode, the active material for a negative electrode as the counter electrode thereof may be a metallic lithium, a lithium alloy, or a carbonaceous material such as graphite or coke.

(Second Embodiment)

Next, a nonaqueous electrolyte battery according to the second embodiment will be explained.

The nonaqueous electrolyte battery according to the embodiment comprises a positive electrode, a negative electrode, a nonaqueous electrolyte and a case. The positive electrode is spatially apart from the negative electrode in such a manner that, for example, a separator is interposed between the electrodes. The nonaqueous electrolyte filled into the case.

Figure 2:
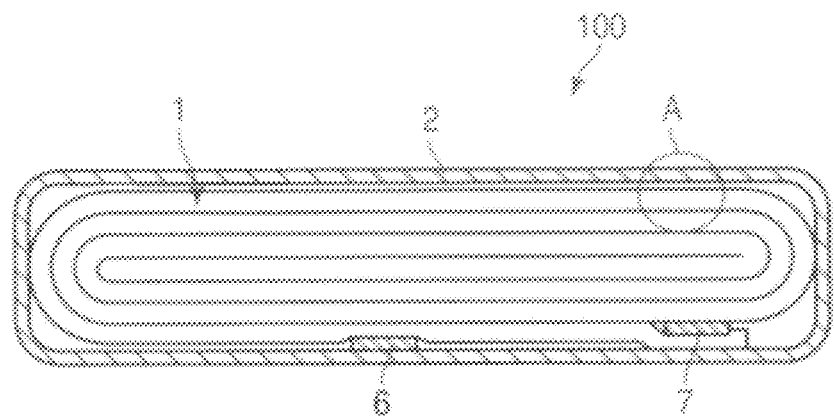
FIG. 2 is a sectional view showing a flat type nonaqueous electrolyte battery of a second embodiment.
Figure 3:
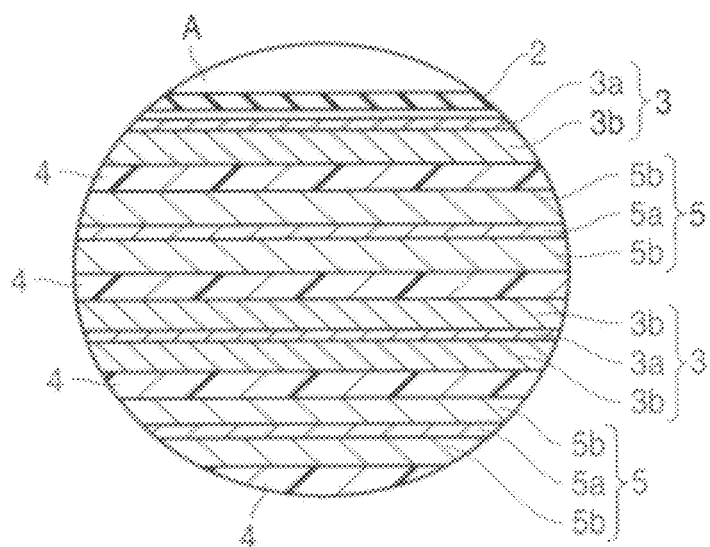
FIG. 3 is an enlarged sectional view of the part A in FIG. 2.

FIGS. 2 and 3 show a specific example of the nonaqueous electrolyte battery. FIG. 2 is a schematic sectional view of a flat type nonaqueous electrolyte battery 100. A case 2 in the battery 100 is made of a laminate film. FIG. 3 is an enlarged sectional view of a part A in FIG. 2. The figures are each a schematic view referred to in order to describe the battery. The shape and the sizes of each member therein, the ratio between some of the sizes, and others may be different from those in an actual form of the device (battery); however, these may be appropriately changed with reference the following description and any known technique.

A flat coil electrode group 1 is accommodated in a bag-form case 2 made of laminate film. The laminate film has an aluminum foil piece interposed between two resin layers. The flat coil electrode group 1 is formed by spirally coiling a laminate obtained by laminating a negative electrode 3, a separator 4, a positive electrode 5 and a separator 4 in this order from the outside and by press-molding the coiled laminate. The negative electrode 3 comprises a negative electrode current collector 3a and a negative electrode layer 3b. The negative electrode layer 3b comprises a negative electrode active material according to the first embodiment. The outermost negative electrode 3 has a structure in which as shown in FIG. 3, a negative electrode layer 3b is formed on one inside surface of a negative electrode current collector 3a. Other negative electrodes 3 each has a structure in which a negative electrode layer 3b is formed on each surface of the negative electrode current collector 3a.

The positive electrode 5 has a structure provided with a positive electrode layer 5b on each side of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. These negative electrode terminal 6 and positive electrode terminal 7 are externally extended from an opening part of the baggy case 2. A liquid nonaqueous electrolyte is, for example, injected from the opening part of the baggy case 2. The opening part of the baggy case 2 is closed by heat sealing, extending the negative electrode terminal 6 and positive electrode terminal 7 through the sealing part. Thereby the coil electrode group 1 and liquid nonaqueous electrolyte is sealed in the baggy case 2.

The negative electrode terminal 6 is made of, for example, a material having electroconductivity, and electrical stability in a potential range from 1 V to 3 V relative to a metallic lithium. A specific example thereof include aluminum, and an aluminum alloy containing element(s) such as Mg, Ti, Zn, Mn, Fe, Cu, and Si. The negative electrode terminal 6 is preferably made of the same material as the negative electrode current collector to reduce the contact resistance with the negative electrode current collector 3a.

The positive electrode terminal 7 is made of, for example, a material having electroconductivity, and electrical stability in a potential range from 3 to 4.25 V relative to metallic lithium. A specific example thereof include aluminum, and an aluminum alloy containing element(s) such as Mg, Ti, Zn, Mn, Fe, Cu, and Si. The positive electrode terminal 7 is preferably made of the same material as the positive electrode current collector 5a to reduce the contact resistance with the positive electrode current collector 5a.

Hereinafter, a detailed description is made about the case 2, the negative electrode 3, the positive electrode 5, the separators 4 and the nonaqueous electrolyte, which constitute members of the nonaqueous electrolyte battery 100.

1) Case

The case 2 may be a laminate film having a thickness of 0.5 mm or less, or a metallic vessel having a thickness of 1 mm or less. The thickness of the metallic vessel is preferably 0.5 mm or less.

Examples of the shape of the case include a flat type (that is, thin type), angular type, cylinder type, coin type and button type. Examples of the case include, depending on the dimension of the battery, for example, case for small-sized batteries to be mounted on portable electronic devices and case for large-sized batteries to be mounted on, for example, two- to four-wheel vehicles.

A multilayer film obtained by interposing a metal layer between resin layers is used as the laminate film. The metal layer is preferably an aluminum foil or aluminum alloy foil in view of light-weight characteristics. Polymer materials such as a polypropylene (PP), polyethylene (PE), nylon and polyethylene terephthalate (PET) may be used for the resin layer. The laminate film can be molded into the shape of the case by heat sealing.

The metal case may be constituted of aluminum, an aluminum alloy or the like. The aluminum alloy is preferably an alloy comprising elements such as magnesium, zinc and silicon. When transition metals such as iron, copper, nickel and chromium are comprised in the alloy, the content of these transition metals is preferably 100 ppm by mass or less.

2) Negative Electrode

The negative electrode 3 comprises the current collector 3a, and the negative electrode layer 3b. The negative electrode layer comprises an active material, a conductive agent and a binder. The negative electrode layer is formed on one or both surfaces of the current collector.

The active material is an active material for a battery which comprises the monoclinic β-type titanium composite oxide explained in the first embodiment.

The high-current property and the charge/discharge cycle performance can be improved in the nonaqueous electrolyte battery 100 by using the active material as the negative electrode active material.

The conductive agent improves the current collective performance of the active material and reduces the contact resistance with the current collector. Examples of the conductive agent include carbonaceous materials such as acetylene black, carbon black and graphite.

The binder makes it possible to bind the active material and the conductive agent to each other. Examples of the binder include polytetrafluoroethylene (PTFE), polyvinylidene fluoride (PVdF), fluorine-contained rubber, and styrene butadiene rubber.

In the negative electrode layer 3b, the active material, the conductive agent and the binder are preferably formulated in ratios of 70% to 96% by mass, 2% to 28% by mass, and 2% to 28% by mass, respectively. When the amount of the conductive agent is 2% or more by mass, the current collecting performance of the negative electrode layer 3b is improved so that the high-current characteristic of the nonaqueous electrolyte battery 100 can be improved. When the amount of the binder is 2% or more by mass, the binding performance between the negative electrode layer 3b and the current collector 3a is made high so that the cycle characteristic can be improved. When the amount of the conductive agent and the binder are each 28% or less by mass, the capacity of the battery can be favorably made high.

The current collector 3a is preferably an aluminum foil, which is electrochemically stable in the potential range of 1 V vs. Li/Li+ or higher, or an aluminum alloy foil containing element(s) such as Mg, Ti, Zn, Mn, Fe, Cu, and Si.

The negative electrode 3 can be manufactured by suspending, for example, the active material, conductive agent and binder in a usual solvent to prepare slurry, by applying this slurry to the surface of the current collector and by drying the slurry, to form a negative electrode layer, which is then pressed. The negative electrode may also be manufactured by forming a pellet comprising the active material, conductive agent and binder to produce a negative electrode layer, which is then placed on the current collector.

3) Positive Electrode

The positive electrode 5 comprises the current collector 5a, and the positive electrode layer 5b. The positive electrode layer comprises an active material and a binder. The positive electrode layer is formed on one or both surfaces of the current collector.

The active material may be, for example, an oxide or a polymer.

Examples of the oxide include manganese dioxide ($MnO_2$), iron oxide, copper oxide and nickel oxide in which lithium is adsorbed, lithium manganese composite oxide (such as $Li_xMn_2O_4$ and $Li_xMnO_2$), lithium nickel composite oxide (such as $Li_xNiO_2$), lithium cobalt composite oxide (such as $Li_xCoO_2$), lithium nickel cobalt composite oxide (such as $LiNi_{1-y}Co_yO_2$), lithium manganese cobalt composite oxide (such as $Li_xMn_yCo_{1-y}O_2$), lithium manganese nickel composite oxide having a spinel structure (such as $Li_xMn_{2-y}Ni_yO4$), lithium phosphorus oxide having an olivine structure (such as $Li_xFePO_4$, $Li_xFe_{1-y}Mn_yPO_4$ and $Li_xCoPO_4$), iron sulfate ($Fe_2(SO_4)_3$), and vanadium oxide (such as $V_2O_5$) wherein x and y preferably satisfy the following: $0<x\le1$ and $0\le y\le1$.

Examples of the polymer include a conductive polymer such as polyaniline and polypyrrole, and a disulfide-based polymer material. Sulfur (S) and carbon fluoride also may be used as the active material.

Preferred examples of the active material include a lithium manganese composite oxide ($Li_xMn_2O_4$), a lithium nickel composite oxide ($Li_xNiO_2$), a lithium cobalt composite oxide ($Li_xCoO_2$), a lithium nickel cobalt composite oxide ($Li_xNi_{1-y}Co_yO_2$), a lithium manganese nickel composite oxide having a spinel structure ($Li_xMn_{2-y}Ni_yO_4$), a lithium manganese cobalt composite oxide ($Li_xMn_yCo_{1-y}O_2$), and a lithium iron phosphate ($Li_xFePO_4$), each of which gives a high positive electrode voltage, wherein x and y preferably satisfy the following: $0<x\le1$ and $0\le y\le1$.

The active material is more preferably a lithium cobalt composite oxide or a lithium manganese composite oxide. This active material is high in ion conductivity. Thus, in any combination with the above-mentioned negative electrode active material, the diffusion of lithium ions in the positive electrode active material scarcely becomes a rate-determining step. Therefore, this active material is excellent in adaptability to the lithium titanium composite oxide in the negative electrode active material.

The conductive agent improves the current collecting performance of the active material, and reduces the contact resistance between the active material and the current collector. Examples of the conductive agent include carbonaceous materials such as acetylene black, carbon black and graphite.

The binder binds the active material with the conductive agent. Examples of the binder include polytetrafluoroethylene (PTFE), polyvinylidene fluoride (PVdF), and fluorine-contained rubber.

In the positive electrode layer 5b, the active material, the conductive agent and the binder are preferably formulated in a ratio of 80% to 95% by mass, 3% to 18% by mass, and 2% to 17% by mass, respectively. When the amount of the conductive agent is 3% or more by mass, the above-mentioned advantageous effects can be produced. When the amount of the conductive agent is 18% or less by mass, the decomposition of the nonaqueous electrolyte on the surface of the conductive agent can be decreased when the battery is stored at high temperature. When the amount of the binder is 2% or more by mass, sufficient positive electrode strength can be obtained. When the amount of the binder is 17% or less by mass, the formulated ratio of the binder which is an insulating material in the positive electrode is decreased so that the internal resistance can be decreased.

The current collector is preferably an aluminum foil, or an aluminum alloy foil containing element(s) such as Mg, Ti, Zn, Mn, Fe, Cu, and Si.

The positive electrode 5 can be manufactured by suspending, for example, the active material and binder, and optionally the conductive agent, in an appropriate solvent to prepare slurry, by applying this slurry to the surface of the positive electrode current collector 5a and by drying the slurry, to form a positive electrode layer, which is then pressed. The positive electrode 5 may also be manufactured by forming a pellet comprising the active material and binder and optionally the conductive agent to produce a positive electrode layer, which is then placed on the current collector.

4) Nonaqueous Electrolyte

The nonaqueous electrolyte may be a liquid nonaqueous electrolyte prepared by dissolving an electrolyte in an organic solvent, or a gel-like nonaqueous electrolyte prepared by forming a composite of a liquid electrolyte and a polymer material.

The liquid nonaqueous electrolyte is preferably prepared by dissolving the electrolyte in an organic solvent in a concentration of 0.5 mol/L or more and 2.5 mol/L or less.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], or mixtures of these compounds. The electrolyte is preferably one which is resistant to oxidizing even at a high potential and $LiPF_6$ is most preferable.

Examples of the organic solvent include propylene carbonate (PC), ethylene carbonate (EC) and cyclic carbonates such as vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either solely or in combinations of two or more.

Examples of the polymer material include a polyvinylidene fluoride (PVdF), polyacrylonitrile (PAN) and polyethylene oxide (PEO).

The organic solvent is preferably a mixed solvent made of at least two selected from the group consisting of propylene carbonate (PC), ethylene carbonate (EC) and diethyl carbonate (DEC), or a mixed solvent containing γ-butyrolactone (GBL). By use of the mixed solvent, a nonaqueous electrolyte battery excellent in high-temperature property can be obtained.

5) Separators

The separator may be formed of a porous film comprising a polyethylene, polypropylene, cellulose or polyvinylidene fluoride (PVdF), or synthetic resin nonwoven fabric. Among these materials, a porous film formed of a polyethylene or polypropylene melts at a fixed temperature, making possible to shut off current and can, therefore, improve safety.

According to the embodiment it is possible to provide a nonaqueous electrolyte battery having an excellent charge/discharge cycle performance.

(Third Embodiment)

Next, a battery pack will be explained with reference to the drawings. The battery pack comprises one or more of the nonaqueous electrolyte batteries (that is, unit cells) according to the second embodiment. When the battery pack includes two or more unit cells, these unit cells are disposed in such a manner that they are electrically connected in series or in parallel.

Figure 4:
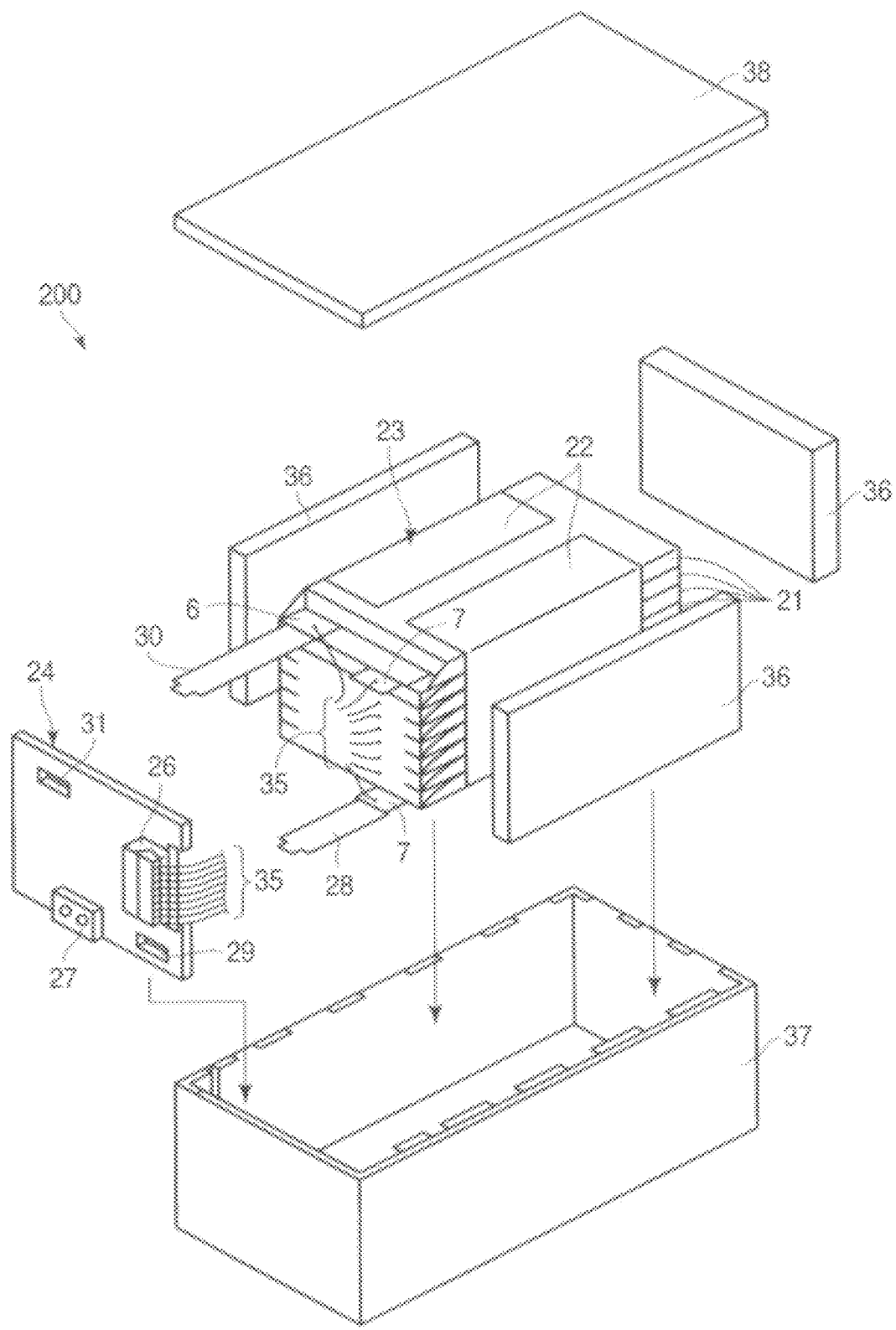
FIG. 4 is an exploded perspective view of a battery pack of a third embodiment.
Figure 5:
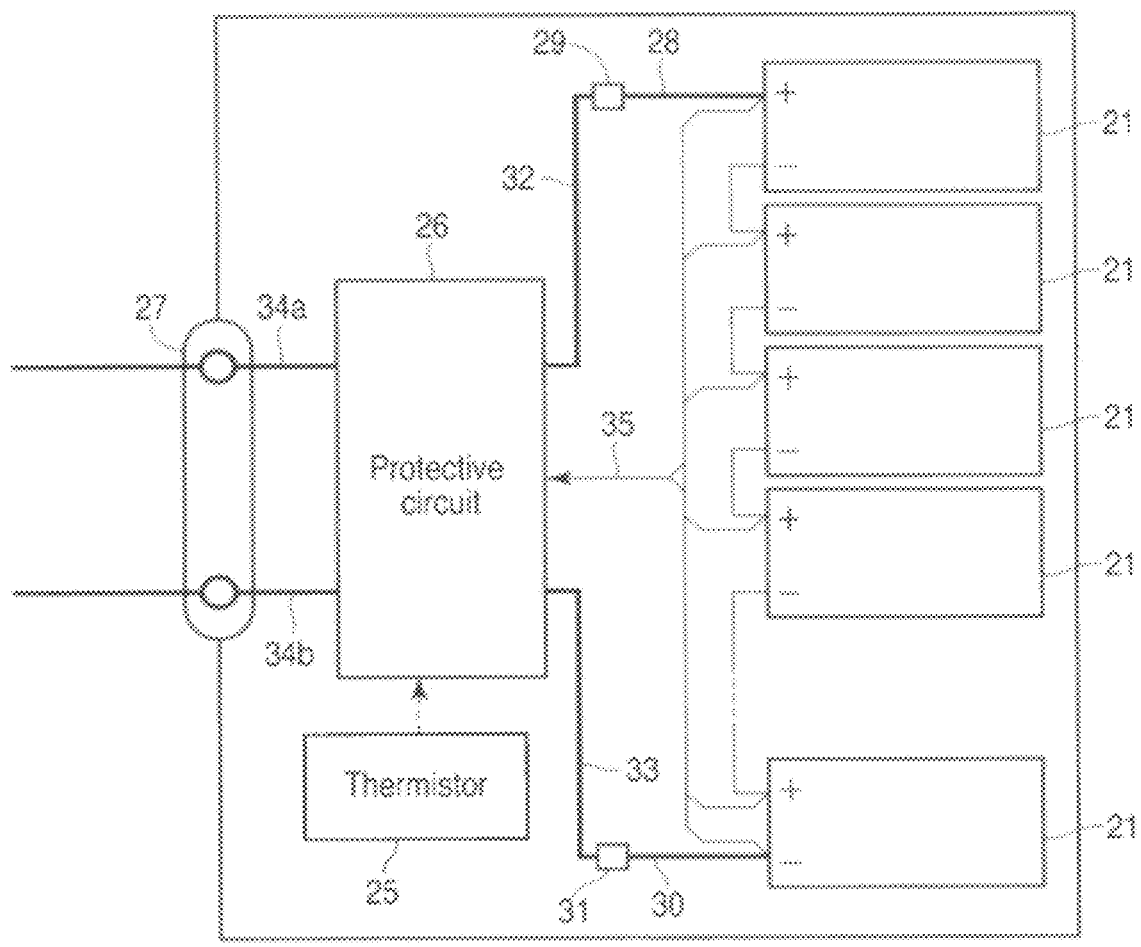
FIG. 5 is a block diagram showing an electric circuit of the battery pack in FIG. 4.

FIGS. 4 and 5 show an example of a battery pack 200. In the battery pack 200, the flat type nonaqueous electrolyte battery shown in FIG. 2 is used as each unit cell 21.

A plurality of unit cells 21 are laminated such that the externally extended negative electrode terminal 6 and positive electrode terminal 7 are arranged in the same direction and fastened with adhesive tape 22 to thereby constitute a battery module 23. These unit cells 21 are electrically connected in series as shown in FIG. 5.

A printed wiring board 24 is disposed opposite to the side surface of the unit cell 21 from which the negative electrode terminal 6 and positive electrode terminal 7 are extended. As shown in FIG. 5, a thermistor 25, a protection circuit 26 and an energizing terminal 27 connected to external devices are mounted on the printed wiring board 24. An insulating plate (not shown) is attached to the surface of the protection circuit substrate 24 facing the battery module 23 to avoid unnecessary connection with the wiring of the battery module 23.

A positive electrode lead 28 is connected to the positive electrode terminal 7 positioned on the lowermost layer of the battery module 23 and the other end of the positive electrode lead 28 is inserted into and electrically connected to a positive electrode connector 29 of the printed wiring board 24. A negative electrode lead 30 is connected to the negative electrode terminal 6 positioned on the uppermost layer of the battery module 23 and the other end of the negative electrode lead 30 is inserted into and electrically connected to a negative electrode connector 31 of the printed wiring board 24. These connectors 29 and 31 are connected to the protection circuit 26 through wirings 32 and 33 formed on the printed wiring board 24.

The thermistor 25 is used to detect the temperature of the unit cell 21 and the detected signals are transmitted to the protection circuit 26. The protection circuit 26 can shut off a positive wiring 34a and negative wiring 34b between the protection circuit 26 and the energizing terminal 27 in a predetermined condition. The predetermined condition means, for example, the case where the temperature detected by the thermistor 25 is a predetermined one or higher. Further, the predetermined condition means, for example, the case of detecting over-charge, over-discharge and over-current of the unit cell 21. The detections of this over-charge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted into individual unit cells 21. In the case of FIGS. 4 and 5, a wiring 35 for detecting voltage is connected to each unit cell 21 and the detected signals are transmitted to the protection circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is taken in a case 37 together with protective sheet 36 and printed wiring board 24. Specifically, the protective sheet 36 is disposed on each inside surface in the direction of the long side and on one of the inside surfaces in the direction of the short side of the case 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the case 37.

Here, heat-shrink tape may be used in place of the adhesive tape 22 to secure the battery module 23. In this case, after the protective sheet is disposed on both sides of the battery module and the heat-shrink tapes are wound around the battery module, the heat-shrink tape is shrunk by heating to fasten the battery module.

The structure in which the unit cells 21 are connected in series is shown in FIGS. 4 and 5. However, these unit cells may be connected in parallel to increase the capacity of the battery. Alternatively, these unit cells may be connected by a combination of series-parallel cell connections. The assembled battery packs may be further connected in series or parallel.

According to the embodiment, it is possible to provide a battery pack excellent in charge/discharge cycle performance by using the nonaqueous electrolyte battery as described in the second embodiment.

The form of the battery pack may be appropriately changed in accordance with the usage thereof. The battery pack is preferably used for an article exhibiting an excellent charge/discharge cycle performance when a large current is taken out therefrom. Specifically, the pack is used for, for example, a power source of a digital camera, a hybrid electric two- to four-wheeled vehicle, an electric two- to four-wheeled vehicle, an assisting bicycle, or some other vehicle. In particular, the battery pack comprising a nonaqueous electrolyte battery excellent in high-temperature property is preferably used for a vehicle.

(Fourth Embodiment)

The vehicle according to the fourth embodiment comprises the battery pack according to the third embodiment. Examples of the vehicle include hybrid electric two- to four-wheeled vehicles, electric two- to four-wheeled vehicles, and assisting bicycles.

Figure 6:
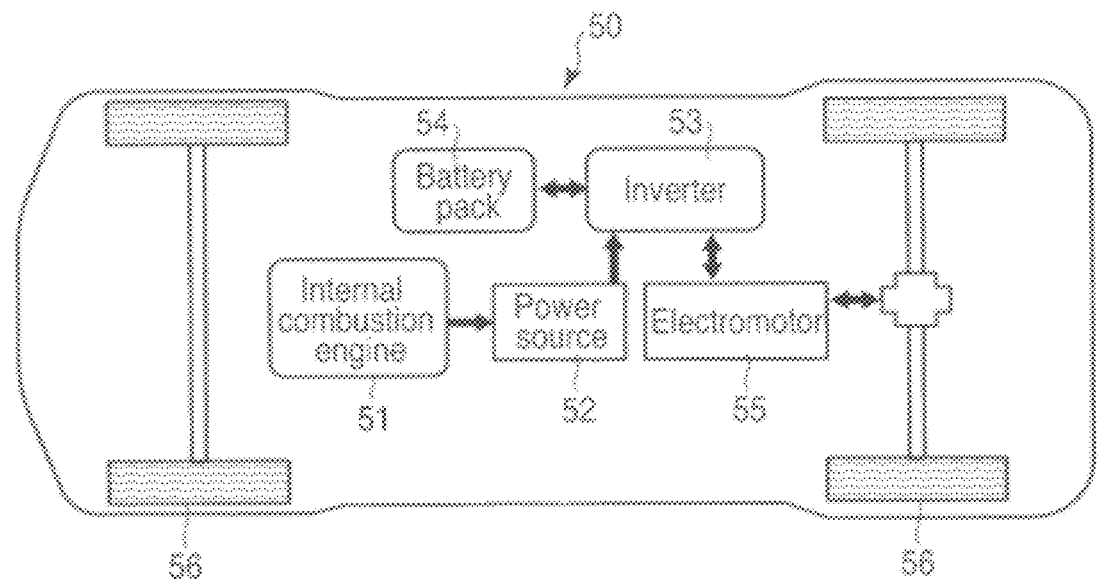
FIG. 6 is a schematic view showing a series hybrid vehicle of an example of a fourth embodiment.
Figure 7:
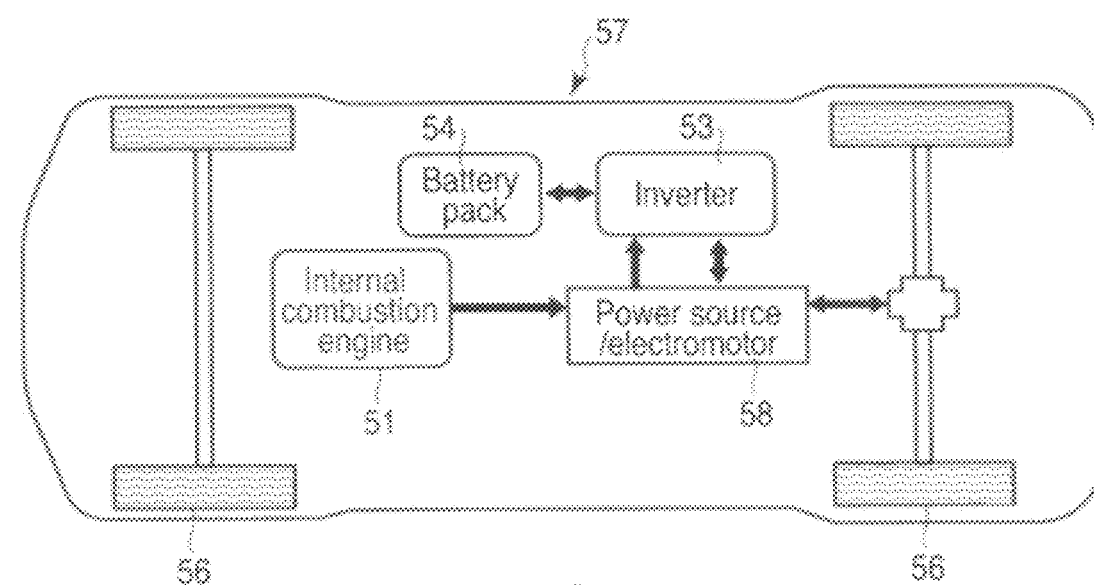
FIG. 7 is a schematic view showing a parallel hybrid vehicle of another example of the fourth embodiment.
Figure 8:
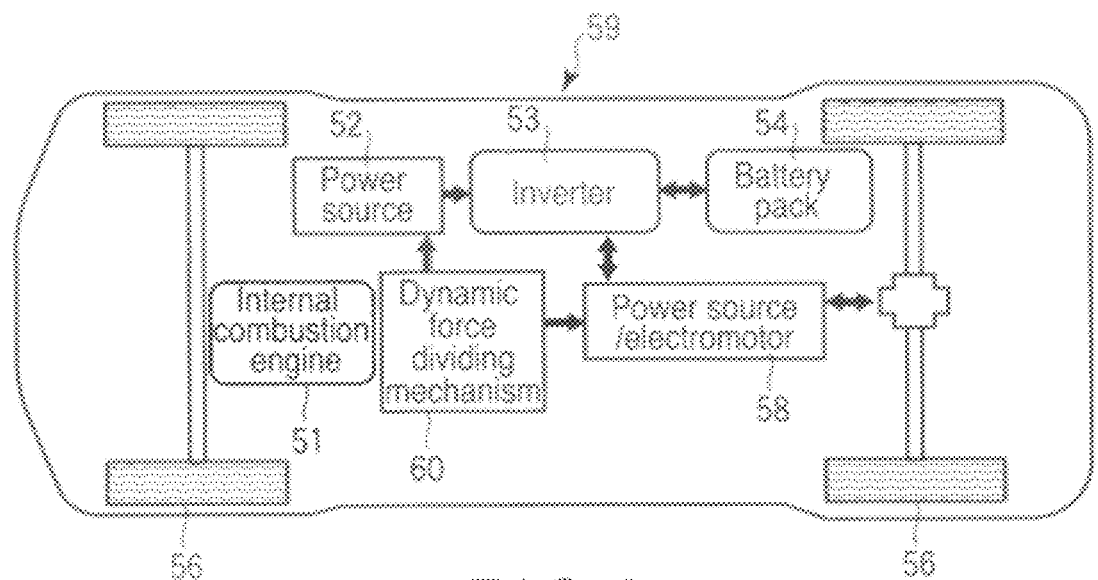
FIG. 8 is a schematic view showing a series parallel hybrid vehicle of another example of the fourth embodiment.

FIGS. 6, 7 and 8 respectively show a hybrid type vehicle using a running power source which produced by combination of an internal combustion engine and an electromotor drivable by a battery. The driving power of any vehicle requires widely-extendable rotation number and torque. In general, the torque and the rotation number which exhibit ideal energy efficiency are restricted in the internal combustion engines. Thus, under other torques and the rotation numbers, the energy efficiency is lowered. Hybrid type vehicle has a characteristic that its internal combustion engine is driven under optimum conditions to generate electric power and further its wheels are driven by a highly efficient electromotor, or the dynamic power of its internal combustion engine and that of its electromotor are combined with each other to drive the wheels, whereby the energy efficiency of the whole of the vehicle can be improved. Moreover, when the speed of the vehicle decreases, the kinetic energy of the vehicle is converted to electric power. Thus, the mileage thereof can be greatly increased from that of ordinary vehicles drivable by their internal combustion engine alone.

Hybrid vehicles can be roughly classified into three types in accordance with the combination of their internal combustion engine with their electromotor.

FIG. 6 shows a hybrid vehicle 50 which is generally called a series hybrid car. All of the dynamic power of an internal combustion engine 51 is once converted to an electric power through a power source 52. This electric power is stored in a battery pack 54 through an inverter 53. As the battery pack 54, the battery pack according to the third embodiment is used. The electric power of the battery pack 54 is supplied through the inverter 53 to an electromotor 55. The electromotor 55 drives wheels 56. In this system, an electromotor is hybridized with an electric vehicle. Its internal combustion engine can be driven in high efficiency condition, and further kinetic energy can be converted into electric power. However, the wheels are driven by only the electromotor, so that a high-power electromotor is required. Additionally, the battery pack is required to have a relatively large capacity. The rated capacity of the battery pack is desirably in the range of 5 to 50 Ah. The capacity is more desirably in the range of 10 to 20 Ah. The rated capacity referred to herein means the capacity of the battery pack when the pack is discharged at a rate of 0.2 C.

FIG. 7 shows a hybrid vehicle 57 called a parallel hybrid car. Reference numeral 58 represents an electromotor which functions also as a power source. An internal combustion engine 51 mainly drives wheels 56. As the case may be, a part of the dynamic force thereof is converted to an electric power through the electromotor 58. By use of the electric power, a battery pack 54 is charged. At the time of the start or acceleration of the vehicle, when a large load is applied to the internal combustion engine, driving force is assisted by the electromotor 58. The base of the vehicle is an ordinary vehicle. In a system of the vehicle, a variation in the load onto the internal combustion engine 51 can be made small to attain a high efficiency. The conversion of kinetic energy to electric power is also carried out by the system. The wheels 56 are driven mainly by the internal combustion engine 51, so that the output power of the electromotor 58 can be decided optionally depended on the percentage of a necessary assist. Thus, the system can be constructed with the relatively small electromotor 58 and battery pack 45. The rated capacity of the battery pack may be in the range of 1 to 20 Ah, preferably in the range of 5 to 10 Ah.

FIG. 8 shows a hybrid vehicle 59 called a series parallel hybrid car. This is a type of combining a series hybrid with a parallel hybrid. A dynamic force dividing mechanism 60 divides the output power of an internal combustion engine 51 into a power for generating electric power and a power for driving wheels. This type makes it possible to control load onto the engine more sensitive than the parallel type to make the energy efficiency higher.

The rate capacity of the battery pack is desirably in the range of 1 to 20 Ah, more desirably in the range of 5 to 10 Ah.

The nominal voltage of the battery pack mounted on a hybrid vehicle as shown in each of FIGS. 6, 7 and 8 is desirably in the range of 200 to 600 V.

Figure 9:
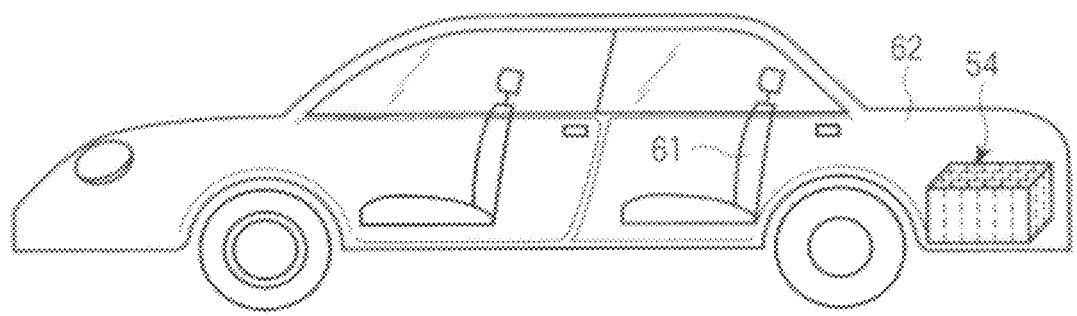
FIG. 9 is a schematic view showing a vehicle according to the fourth embodiment.

In general, the battery packs 54 is preferably arranged in a space which is not easily affected by a change in the temperature of the outside air and is not easily receive any impact when the vehicle collides or undergoes some other accident. For example, in a sedan as shown in FIG. 9, the battery pack may be arranged inside a trunk room 62 behind a rear sheet 61. The battery pack may be arranged under or behind the sheet 61. When the mass of the battery is large, it is preferred to arrange the battery under the sheet or below the floor in order to make the gravity center of the vehicle low.

According to the embodiment, a vehicle having excellent performances can be provided by using the battery pack according to the third embodiment, which is excellent in cycle property.

EXAMPLES

Example 1

<Production of Positive Electrode>

A lithium nickel composite oxide ($LiNi_{0.82}Co_{0.15}Al_{0.03}O_2$) as a positive electrode active material, acetylene black as a conductive agent and polyvinylidene fluoride (PVdF) were used to prepare a positive electrode.

Specifically, 90% by mass of powder of the lithium nickel composite oxide, 5% by mass of acetylene black and 5% by mass of polyvinylidene fluoride (PVdF) were added to N-methylpyrrolidone (NMP) to prepare a slurry. This slurry was applied on both surfaces of a current collector made of aluminum foil and having a thickness of 15 μm and dried and pressed to form a positive electrode having an electrode density of 3.15 g/cm³.

<Synthesis of Monoclinic β-type Titanium Composite Oxide>

Potassium fluoride (KF), potassium carbonate ($K_2CO_3$) and titanium oxide ($TiO_2$) having an anatase structure were mixed. The mixture was baked at 1000° C. for 24 hours to synthesize a fluorine-containing alkali titanate compound $K_2Ti_4(O,F)_9$. The resultant $K_2Ti_4(O,F)_9$ was dry-pulverized with zirconia beads to adjust the particle diameter. Then, the particle was washed with distilled water, and thus a proton exchange precursor was obtained. The proton exchange precursor was added to a solution of 1 M hydrochloric acid, and then the solution was stirred at 25° C. for 12 hours, and thus a proton exchange body was obtained.

The proton exchange body was baked at 350° C. in the atmosphere for 3 hours to produce a fluorine-containing monoclinic β-type titanium composite oxide ($Ti(O,F)_2$).

<X-Ray Diffraction Analysis>

Figure 10:
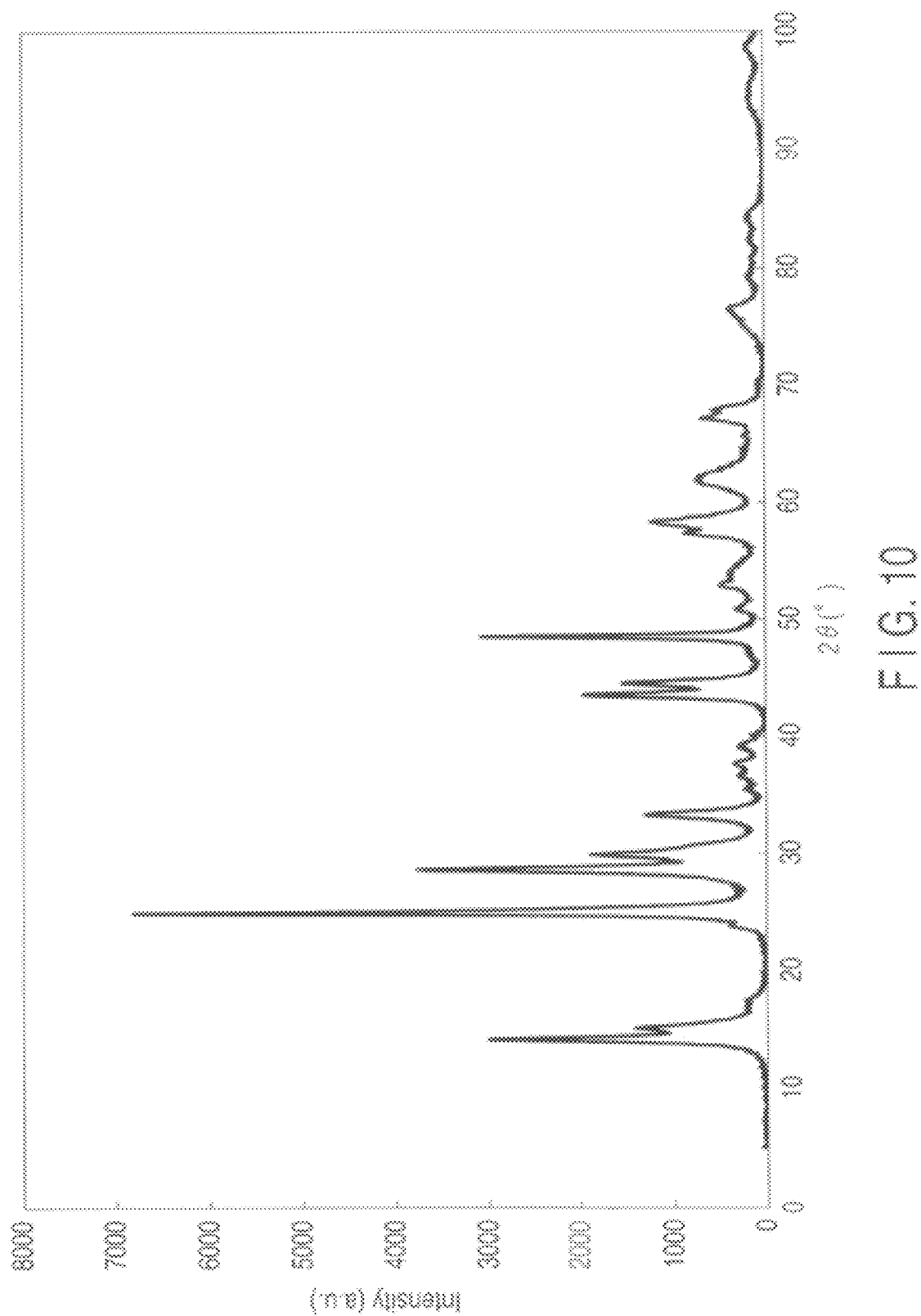
FIG. 10 is an X-ray diffraction chart of a monoclinic β-type titanium composite oxide in Example 1

The resultant titanium composite oxide was filled into a standard glass holder having a diameter of 25 mm, and then the oxide was measured by a wide angle X-ray diffraction method. As a result, an X-ray diffraction pattern shown in FIG. 10 was obtained. From this diffraction pattern, it was identified that a main substance constituting the resultant titanium composite oxide was a monoclinic β-type titanium composite oxide belonging to 46-1237 according to JCPDS (Joint Committee on Powder Diffraction Standards). An apparatus and conditions for the measurement were as follows:

(1) X-ray diffraction apparatus: D8 ADVANCE (inclusion tube type), manufactured by Bruker AXS Co.
  X-ray source: CuKα ray (using a Ni filter)
  Power: 40 kV, 40 mA
  Slit system: Div. Slit; 0.3°
  Detector: LynxEye (high-speed detector)
(2) Scanning manner: 2 θ/θ continuous scanning
(3) Measuring range (2θ): 5 to 100°
(4) Step width (2θ): 0.01712°
(5) Counting time: 1 second/step <Fluorine Content>

The fluorine content in the resultant titanium composite oxide was measured by ion chromatography. As a result, it was ascertained that the fluorine content in the fluorine-containing titanium composite oxide was 0.03% by mass.

<Production of Negative Electrode>

The resultant titanium composite oxide was used as an active material, and acetylene black as a conductive agent and polyvinylidene fluoride (PVdF) were used to produce a negative electrode.

Specifically, 80% by mass of powder of the titanium composite oxide, 10% by mass of acetylene black and 10% by mass of polyvinylidene fluoride (PVdF) were added to N-methylpyrrolidone (NMP) to prepare slurry. This slurry was applied on both surfaces of a current collector made of aluminum foil and having a thickness of 15 μm, and dried and pressed to form a negative electrode having an electrode density of 2.0 g/cm³.

<Production of Electrode Group>

The positive electrode, a separator which was a porous film made of polyethylene and having a thickness of 25 μm, the negative electrode, and the same separator were laminated in this order and coiled into a spiral form. This was subjected to heating press at 90° C. to form a flat electrode group having a width of 30 mm and a thickness of 1.8 mm. The resultant electrode group was accommodated in a case made of a laminate film and vacuum-dried at 80° C. for 24 hours. The laminate film comprised an aluminum foil of 40 μm thickness and polypropylene layers on the both surface of the aluminum foil, and had the total thickness of 0.1 mm.

<Preparation of Liquid Nonaqueous Electrolyte>

Propylene carbonate (PC) and diethyl carbonate (DEC) were mixed at a ratio by volume of 1:2 to prepare a mixed solvent. The liquid nonaqueous electrolyte was prepared by dissolved 1 M of $LiPF_6$ as electrolyte to mixed solvent.

<Production of Nonaqueous Electrolyte Secondary Battery>

The liquid nonaqueous electrolyte was poured into the case. The case was completely sealed by heat-sealing. Thus, a nonaqueous electrolyte secondary battery was obtained. The nonaqueous electrolyte secondary battery had a structure as shown in FIG. 2 and had a width of 35 mm, a thickness of 2 mm and a height of 65 mm.

Examples 2 to 6

The nonaqueous electrolyte secondary battery was produced in the same manner as in Example 1 except that a monoclinic β-type titanium composite oxide which contains fluorine in an amount shown in Table 1 was used as the negative electrode active material.

Comparative Example 1

A nonaqueous electrolyte secondary battery was produced in the same manner as in Example 1 except that a monoclinic β-type titanium oxide ($TiO_2$) was synthesized without using potassium fluoride (KF) as the starting materials, and the oxide was used as the negative electrode active material.

Example 7

The titanium oxide synthesized in Comparative Example 1 was treated with fluorine to produce a fluorine-containing titanium oxide. A nonaqueous electrolyte secondary battery was produced in the same manner as in Example 1 except that the treated titanium oxide was used as the negative electrode active material. The fluorine treatment was conducted by allowing the titanium composite oxide to stand still at 80° C. in $F_2$/Ar gas having a fluorine partial pressure proportion of 20% for 10 hours. The fluorine content in the treated titanium oxide was 1.2% by mass.

Example 8

A nonaqueous electrolyte secondary battery was produced in the same manner as in Example 1 except that the titanium composite oxide synthesized in Example 3 was treated with fluorine and the treated titanium composite oxide was used as the negative electrode active material. The fluorine treatment was conducted by allowing the titanium composite oxide to stand still at 80° C. in $F_2$/Ar gas having a fluorine partial pressure proportion of 20% for 10 hours. The fluorine content in the treated titanium composite oxide was 2.2% by mass.

(Analysis)

The sectional tissue of the titanium oxides synthesized in Examples 1 to 8 was observed by EPMA. As a result, it was confirmed that surface layer containing fluorine at a high content was present in each titanium oxide.

It was also confirmed that each titanium oxide has a peak belonging to fluoride at 838.4 cm$^{-1}$ in an infrared diffuse reflection spectrum with Fourier transform infrared spectrophotometry (FT-IR).

Figure 11:
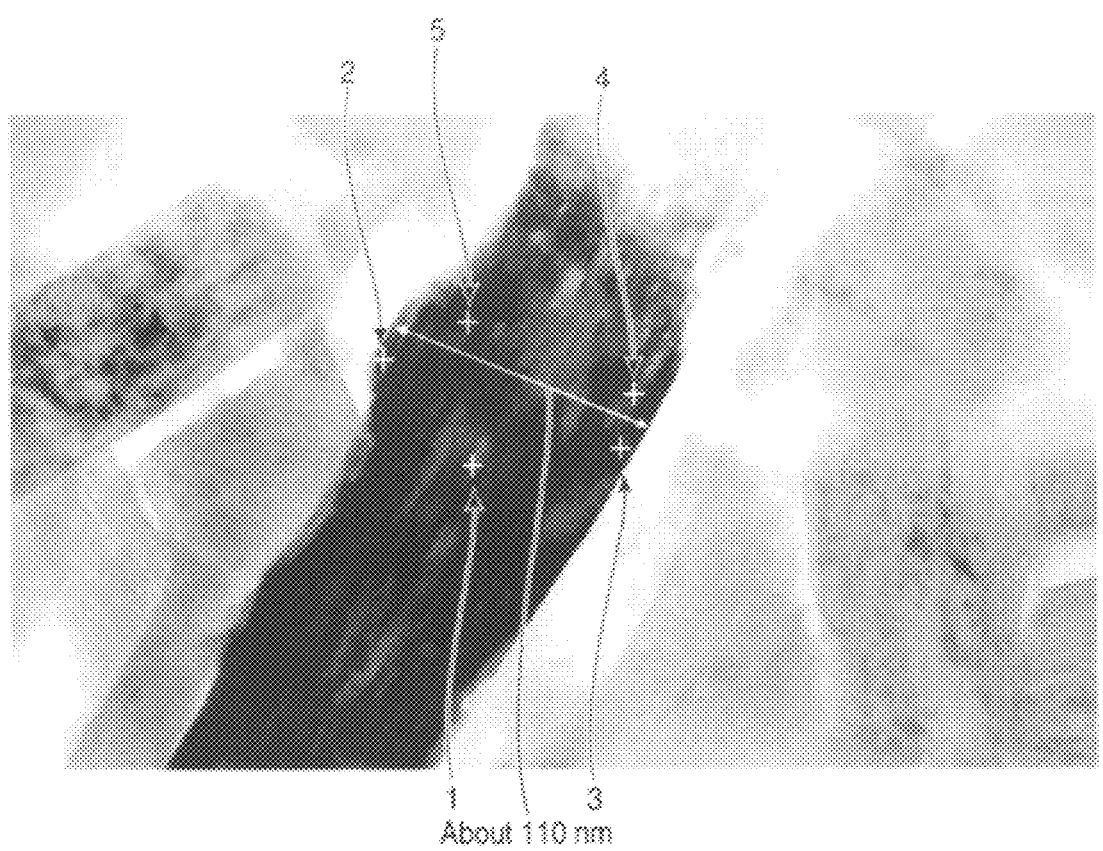
FIG. 11 is a TEM photograph of a monoclinic β-type titanium composite oxide in Example 7.

The cross section of the particle of the titanium oxide synthesized in Examples 7 and 8 was observed by TEM-EDX. FIG. 11 show a TEM photograph of the titanium composite oxide synthesized in Example 7. Point-analysis was carried out in five points 1 to 5 shown in FIG. 11. The point 1 was located to have a depth of about 50 nm from the surface of the particle. The points 2 to 5 were located within the depth of 20 nm from the surface of the particle.

FIGS. 12 and 13 show EDX analysis results in the points 1 and 2, respectively. As shown in FIG. 12, the fluorine was not identified in the point 1. On the other hand, as shown in FIG. 13, the fluorine was identified in the point 2. The fluorine was also identified in the points 3 to 5.

The fluorine content in the point 2 was about 3.9% by mass, and that in the point 5 was about 2.0% by mass. It is suggested that fluorine tends to be present at a higher content at a position nearer to the surface of the particle.

(Measurement of Battery Performances)

The resistance values of the secondary batteries of Examples 1 to 8 and Comparative Examples 1 were measured. The resistance was measured at a 1 kHz alternating current impedance. Thereafter, a charge/discharge cycle test was made. In this test, a charge/discharge cycle of performing charging at 1 C and discharging at 1 C was repeated 200 times.

The discharge maintenance ratio (%), that is, the ratio of the discharge capacity in the 200$^{th}$ cycle to the initial discharge capacity, is shown in Table 1. The ratio of the resistance value after the 200$^{th}$ cycle to the resistance value before the cycles is calculated for each batteries, and shown in Table 1 as the resistance increase ratio (times). The resistance was measured at 1 kHz alternating current impedance.

Furthermore, in the batteries of Examples 1 to 3 and Comparative Example 1, a change in the capacity during the cycles was measured. The results are shown in FIG. 14 as the capacity ratio (%).

TABLE 1

|  | Fluorine content [% by mass] | Ratio of resistance values | Capacity maintenance ratio [%] |
| --- | --- | --- | --- |
| Example 1 | 0.03 | 0.48 | 55 |
| Example 2 | 0.12 | 0.39 | 83 |
| Example 3 | 1.1 | 0.37 | 90 |
| Example 4 | 3.1 | 0.35 | 92 |
| Example 5 | 4.9 | 0.37 | 90 |
| Example 6 | 10 | 0.41 | 86 |
| Example 7 | 1.2 | 0.34 | 92 |
| Example 8 | 2.2 | 0.28 | 94 |
| Comparative Example 1 | 0 | 1.00 | 18 |

As is evident from Table 1, the batteries of Examples 1 to 8 were lower in the resistance increase ratio, and higher in the capacity maintenance ratio than the battery of Comparative Example 1. It is demonstrated that the batteries of Examples 1 to 8 have an excellent charge/discharge cycle performance. The batteries of Examples 1 to 6 were lower in the resistance increase ratio, and higher in the capacity maintenance ratio than the battery of Comparative Example 1. Thus, it is demonstrated that residual hydroxyl group which is contained in the oxide are substituted by synthesizing a monoclinic β-type titanium composite oxide using a fluoride as one of starting materials. The batteries of Examples 7 and 8 were also lower in the resistance increase ratio, and higher in the capacity maintenance ratio. Thus, it is demonstrated that residual hydroxyl groups which is contained in the oxide are also substituted by treating a monoclinic β-type titanium composite oxide with fluorine.

As shown in FIG. 14, it is also demonstrated that the batteries of Examples 1 to 3 are suppressed in decrease of capacity during the cycles than the battery of Comparative Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material for a battery, comprising a monoclinic β-type titanium composite oxide which comprises fluorine, wherein
   the monoclinic β-type titanium composite oxide has a shape of particle,
   the particle comprises a surface layer and a central part, the surface layer comprising the surface of the particle and an outer layer having a depth of less than 20 nm from the surface of the particle, the central part having a depth of 20 nm or more from the surface of the particle, and
   the surface layer has a fluorine content higher than a fluorine content in the central part.

2. The active material according to claim 1, wherein the monoclinic β-type titanium composite oxide has a fluorine content of 0.12% to 10% by mass.

3. The active material according to claim 1, which has a peak belonging to a Ti—F bond in the range of 800 to 850 cm$^{-1}$ in an infrared diffuse reflection spectrum with Fourier transform infrared spectrophotometry (FT-IR).

4. A nonaqueous electrolyte battery, comprising:
   a positive electrode;
   a negative electrode comprising an active material according to claim 1; and
   a nonaqueous electrolyte.

5. The nonaqueous electrolyte battery according to claim 4, further comprising a case made of a laminate film.

6. A battery pack, comprising the nonaqueous electrolyte battery according to claim 4.

7. A vehicle, comprising a battery pack according to claim 6.

8. The active material according to claim 1, wherein the monoclinic β-type titanium composite oxide has a fluorine content of 1% to 5% by mass.

9. The active material according to claim 1, wherein the active material is in a form of secondary particles containing primary particles of the monoclinic β-type titanium composite oxide.

10. The active material according to claim 9, wherein the primary particles have an average particle diameter of 10 nm to 1 μm.

11. The active material according to claim 9, wherein the secondary particles have an average particle diameter of 1 μm to 100 μm.

12. The active material according to claim 9, wherein the secondary particle have a specific surface area of 5 m²/g to 50 m²/g.

13. The active material according to claim 1, wherein the monoclinic β-type titanium composite oxide has a structure represented by:

$$Li_xTiO_2$$

where $0 \leq x \leq 1$.

* * * * *